United States Patent
Hopkinson et al.

(10) Patent No.: US 10,589,228 B2
(45) Date of Patent: Mar. 17, 2020

(54) DI-SUBSTITUTED SILOXANE SOLVENTS FOR GAS CAPTURE

(71) Applicants: David P. Hopkinson, Morgantown, WV (US); Nicholas Siefert, Pittsburgh, PA (US); Robert L. Thompson, Pittsburgh, PA (US); Megan Macala, Pittsburgh, PA (US); Lei Hong, Pittsburgh, PA (US)

(72) Inventors: David P. Hopkinson, Morgantown, WV (US); Nicholas Siefert, Pittsburgh, PA (US); Robert L. Thompson, Pittsburgh, PA (US); Megan Macala, Pittsburgh, PA (US); Lei Hong, Pittsburgh, PA (US)

(73) Assignee: U.S. Department of Energy, Washington, DC (US)

( * ) Notice: Subject to any disclaimer, the term of this patent is extended or adjusted under 35 U.S.C. 154(b) by 0 days.

(21) Appl. No.: 15/989,444

(22) Filed: May 25, 2018

(65) Prior Publication Data

US 2019/0358585 A1    Nov. 28, 2019

(51) Int. Cl.
*B01D 53/86* (2006.01)

(52) U.S. Cl.
CPC .. *B01D 53/8618* (2013.01); *B01D 2252/2026* (2013.01); *B01D 2257/504* (2013.01)

(58) Field of Classification Search
None
See application file for complete search history.

(56) References Cited

U.S. PATENT DOCUMENTS

| 5,968,872 A | 10/1999 | Policello et al. |
| 9,643,123 B2 | 5/2017 | Nulwala et al. |
| 2005/0222001 A1* | 10/2005 | Baumeister ............ A61K 8/046 510/123 |

* cited by examiner

*Primary Examiner* — Daniel Berns
(74) *Attorney, Agent, or Firm* — Jacob A. Heafner; Michael J. Dobbs; Brian J. Lally

(57) ABSTRACT

The present disclosure provides a method for the separation of a gas constituent from a gaseous mixture. The disclosure also provides polyethylene glycol disubstituted siloxane based solvents for use in the method. These solvents are of use for pre-combustion $CO_2$ capture and are capable of replacing glycol-based solvents while offering operation at a higher temperature region. These solvents are also of use for generation of hydrogen from reformed natural gas or syngas, adjusting $CO/H_2$ ratio for Coal & Biomass to Liquids, removal of $CO_2$ from syngas for coal & biomass to $NH_3$/Fertilizer, natural gas sweetening, and upgrading of landfill and biogas.

15 Claims, 13 Drawing Sheets

PEG-olefins:

2,5,8-trioxaundec-11-ene 2,5,8,11-tetraoxatetradec-13-ene 2,5,8,11,14-pentaoxaheptadec-16-ene disiloxane:

tetrasiloxanes:

trisiloxanes:

DI-SUBSTITUTED SILOXANE SOLVENTS FOR GAS CAPTURE

GOVERNMENT INTERESTS

The United States Government has rights in this invention pursuant to the employer-employee relationship of the Government to the inventors as U.S. Department of Energy employees and site-support contractors at the National Energy Technology Laboratory.

BACKGROUND OF THE DISCLOSURE

A variety of methods have been proposed to capture $CO_2$ including solvent, sorbent, and membrane technology. Pre-combustion capture of $CO_2$ is typically accomplished with physical solvents, given that the high partial pressure of $CO_2$ in the syngas gas stream is sufficient to dissolve significant amounts of $CO_2$ into the solvent without the need for chemical binding. Physical solvents are favored over chemical solvents in systems where the partial pressure of $CO_2$ is high. A typical pre-combustion fuel gas stream for a coal combustion system consists of 30-32% $CO_2$, 43% $H_2$, 23% $H_2O$, and 3% impurities such as CO, COS, $H_2S$.

The current state-of-the-art $CO_2$ capture technologies for pre-combustion processes, such as Integrated Gasification Combined Cycle (IGCC) systems, employ the glycol-based Selexol solvent that preferentially absorb $CO_2$ and sulfur compounds from the syngas mixture. One major area for improvement in the baseline IGCC process is the reduction of the energy penalty associated with cooling the syngas to below room-temperature to remove $CO_2$ and $H_2S$ prior to combustion. Selexol removes water from the pre-combustion fuel gas stream, which is needed as an energy-generation source in the combustion turbine; therefore, a further energy penalty is paid for the regeneration of $CO_2$ from Selexol to remove the water dissolved within. It has been reported that the electrical efficiency of an IGCC power plant could improve by 3 basis points, and the levelized cost of electricity could decrease by 20% when implementing warm gas clean-up of both pollutants and $CO_2$. In part, this energy and cost savings is due to (a) not having to chill the solvent and (b) being able to use low-grade/waste heat to do the regeneration.

While hydrophilicity is an ideal quality for a solvent in the natural gas industry, hydrophilicity is not ideal for IGCC applications. The ideal qualities of a physical solvent for IGCC applications are high $CO_2$ uptake, extremely high $H_2S$ uptake, low uptake of $H_2/CO/N_2/CH_4$, high $CO_2$ diffusivity, low vapor pressure, low tendency to foam/aerosolize, high mass density, low water uptake, and operating stability above ambient temperature.

The present disclosure provides a method for the separation of a gas constituent from a gaseous mixture. The disclosure also provides polyethylene glycol disubstituted siloxane based solvents for use in the method. These solvents are of use for pre-combustion $CO_2$ capture and are capable of replacing glycol-based solvents while offering operation at a higher temperature region. These solvents are also of use for generation of hydrogen from reformed natural gas or syngas, adjusting $CO/H_2$ ratio for Coal & Biomass to Liquids, removal of $CO_2$ from syngas for coal & biomass to $NH_3$/Fertilizer, natural gas sweetening, and upgrading of landfill and biogas.

As used in the disclosed method, the solvents provide an advantageous characteristic as they are low foaming. Foaming is of concern because it severely affects the operations in chemical processes and thereby the design of chemical reactors such as absorption columns which leads to additional costs. Foaming in a liquid solvent process may also significantly reduce mass transfer of $CO_2$ into the solvent because foaming requires that the absorber be operated at lower gas flow velocities. As such, it is beneficial that the physical solvent not be prone to foaming or misting to keep capital costs for the absorber to a minimum. An ideal physical solvent in IGCC operations would absorb as much $CO_2$ and as little $H_2O$ and $H_2$ as possible at temperatures above 40° C. for efficient capture of $CO_2$, while significantly reducing the tendency to foam under flowing gas.

There is an existing and emerging need for solvents for gas separation purposes. More particularly, there is a need for hydrophobic, low foaming, temperature stabile solvents for the efficient removal of $CO_2$ from gas streams.

BRIEF SUMMARY OF THE DISCLOSURE

Embodiments described herein include, for example, a method for separating a gas constituent from a gaseous mixture, and a solvent for the separation of a gas constituent from a gaseous mixture. Systems and devices can also be provided which use these solvents and relate to the methods.

For example, one lead aspect provides for a method for separating a gas from a gaseous mixture, the method comprising: supplying a gaseous mixture, contacting the gaseous mixture with a solvent comprising a linear siloxane base with 2 to 4 Si atoms, where the siloxane base is disubstituted with two polyethylene groups such that at least one constituent of the gaseous mixture at least partially dissolves into the gaseous mixture to form a laden solvent, and regenerating the laden solvent.

Another aspect is for a solvent comprising a siloxane base having 2 to 4 Si atoms, which is covalently modified to be disubstituted with polyethylene glycol (PEG) groups, the PEG being a diox-ene (2PEG), triox-ene (3PEG), tetraox-ene (4PEG), or pentaox-ene (5PEG).

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
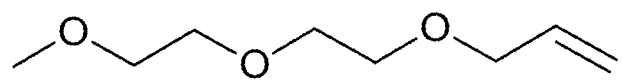
FIG. 1 illustrates PEG-olefins suitable as starting materials appropriate for substitution to the siloxane base.
Figure 1:
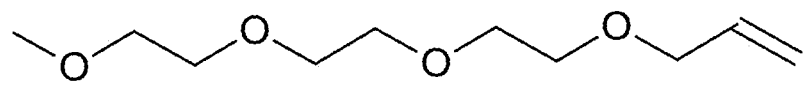
Figure 1:
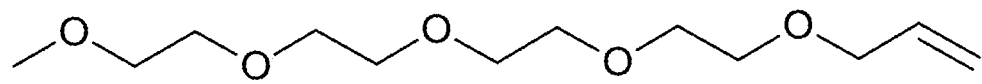

In various exemplary embodiments, the present disclosure relates to a method for the separation of a gas from a gaseous mixture. The method comprises: supplying a gaseous mixture having at least two constituents, contacting the gaseous mixture with a solvent, wherein the solvent comprises a siloxane central unit which is covalently modified with two polyethylene glycol (PEG) groups. Upon contacting the gaseous mixture with the solvent, at least one constituent of the gaseous mixture preferentially dissolves into the solvent forming a laden solvent, and regenerating the laden solvent. The method facilitates the separation of the gas from the gaseous mixture.

It is contemplated that the method will, for example, perform the function of removing carbon dioxide and hydrogen sulfide from pre-combustion gas IGCC system.

The gaseous mixture comprises at least two and may further comprise many additional constituents, including gaseous and nongaseous constituents. The gaseous mixture typically will comprise carbon dioxide and hydrogen, or carbon dioxide, hydrogen, and water. Other constituents which may be present include, for example, methane, carbon monoxide, carbonyl sulfide, hydrogen sulfide, and nitrogen.

In many situations, advantages can be obtained when water is allowed to be present, or steps are not taken to remove water. The gaseous mixture can be saturated with water, including water vapor. The amount of water is not particularly limited, but in many cases, will be saturated at the particular temperature of the gaseous components. The saturation amount, as known in the art, can be adapted for the particular temperature and pressure desired.

In many situations, the goal will be to separate carbon dioxide from another constituent such as hydrogen. The gaseous mixture may be part of a capture process for carbon dioxide, including both pre-combustion and post-combustion capture. The gaseous mixture may be part of an IGCC plan. The gaseous mixture also may be part of a water gas shift reaction including the post-water-gas shift reaction stream. Post-combustion processes may include flue gas from fossil fuel driven production operations. Alternate applications for the method and solvent include for the separation of hydrogen from reformed natural gas or syngas, adjusting carbon monoxide/hydrogen ratio for Coal & Biomass to Liquids, removal of carbon dioxide from syngas for Coal & Biomass to ammonia/fertilizer, natural gas sweetening, and upgrading of landfill and biogas. In one embodiment, the constituent preferentially dissolved into the solvent are acid gasses carbon dioxide and hydrogen sulfide. In another embodiment, the constituent preferentially dissolved into the solvent is carbon dioxide.

In some embodiments, the mole percent of carbon dioxide is about 10% to about 60%, or about 20% to about 50%, or about 25% to about 35%.

In some embodiments, the mole percent of hydrogen can be about 10% to about 70%, or about 20% to about 60%, or about 30% to about 50%.

In some embodiments, the mole percent of carbon dioxide can be about 5% to about 50%, or about 10% to about 40%, or about 15% to about 30%.

The combined mole percent of carbon dioxide and hydrogen in the gaseous mixture can be, for example, about 50% to about 90%, or about 60% to about 85%, or about 70% to about 80%.

The combined mole percent of carbon dioxide, hydrogen, and water in the gaseous mixture can be, for example, about 80% to about 99%, or about 90% to about 98%, or about 95% to about 98%.

In supplying a gaseous mixture, the gaseous mixture is provided a reaction space where contacting with the solvent is to occur. The size and shape of the reaction vessel, for example, can be varied. Various operation systems for supplying include, for example, a reaction chamber for batch operations, where the chamber is filled with the gaseous mixture which may then contact a solvent. Supplying may also be performed as a feed stream, where the gaseous mixture is a feed stock in a continuous flow operation. The container can have one or more input ports and one or more exit ports. For example, the contacting step may be carried out in an absorption column. In the contacting step, the gaseous mixture can be passed through a liquid composition such as the solvent.

Parameters for supplying a gaseous mixture are pressure and partial pressure. Typical total pressures experienced are 5 MPa. The carbon dioxide partial pressures in supplying the feed stream can vary from about 0.1 MPa to about 5 MPa and are typically 2.5 MPa with 2.5 MPa partial pressure from other gasses including $H_2$, CO, and $N_2$. In most examples, the carbon dioxide partial pressures are between 0.5 MPa and 3 MPa.

Another parameter for supplying the gaseous mixture is temperature. The temperature can vary throughout the but can be, for example, at the contacting step 0° C. to 90° C., or 10° C. to 90° C., or 40° C. to 90° C., or 40° C. to 80° C.

The gaseous mixture and the solvent are brought together in a contacting step, such that at least one constituent of the gaseous mixture preferentially dissolves into the solvent to form a laden solvent. In preferentially dissolving, one constituent of the gaseous mixture dissolves into the solvent preferentially, either at a higher rate or at a higher capacity, relative to a second constituent. For example, in a gaseous mixture of hydrogen and carbon dioxide, upon contacting the gaseous mixture with the solvent, the carbon dioxide preferentially dissolves into the solvent such that the carbon dioxide is removed from the gaseous mixture and the solvent becomes laden with $CO_2$. The laden solvent thus comprises solvent and the preferentially dissolved constituent. Constituents preferentially dissolved into the solvent are the acid gasses carbon dioxide and hydrogen sulfide. The temperature and pressure of the gaseous mixture, the temperature and pressure of the solvent, and the temperature and pressure of the contacting step can be adapted for the method.

As noted with supplying, a variety of container, absorber, or tower devices as known in the art may be used for the contacting step. One can adapt the parameters to achieve a desired percentage of carbon dioxide capture such as, for example, at least 70%, or at least 80%, or at least 90% carbon dioxide capture. Recycling can be carried out where solvent is looped back into a reactor for further processing.

The contacting step can be part of a larger process flow with other steps both before and after the contacting step.

For example, membrane separation steps can also be carried out as part of the larger process. For example, polybenzimidazole membranes can be used before the solvent removal step in order to remove hydrogen, effectively increasing the partial pressure of carbon dioxide in the gas stream. The contacting step can be also part of a larger process in which sulfur components, including hydrogen sulfide, are removed.

In a preferred embodiment, the contacting step is part of a carbon capture process. For example, an IGCC plant and carbon capture are described in, for example, Field et al., Ind. Eng. Chem. Res., 2011, 50 (19), p. 11306-11312. See also, for example, National Energy Technology Laboratory (NETL) report Cost and Performance Baseline for Fossil Energy Plants: Bituminous Coal and Natural Gas to Electricity Final Report; U.S. Department of Energy, Office of Fossil Energy, NETL, DOE/NETL-2010/1397, 2010.

Within the method, the gaseous mixture is contacted with a solvent composition, or simply solvent. The solvent comprises a linear siloxane based moiety (core) which is covalently modified by the addition of two polyethylene glycol (PEG) groups. Siloxane compounds are known in the art and, generally, are compounds based on the single moiety or repeat moiety —[O—$SiR_1R_2$]— as known in the art. In these molecules R is typically a short alkyl group (frequently —$CH_3$) and $R_1$ and $R_2$ may or may not be identical. They may be low molecular weight compounds or oligomers, where an oligomer is a molecular complex with relatively few repeating units.

In one embodiment, the siloxane core has two Si atoms (a disiloxane as in —$SiR_1R_2$—O—$SiR_1R_2$—), wherein in another embodiment, the siloxane core has three Si atoms (a trisiloxane as in —$SiR_1R_2$—O—$SiR_1R_2$—O—$SiR_1R_2$—), and in another embodiment, the siloxane core has four Si atoms (a tetrasiloxane as in —$SiR_1R_2$—O—$SiR_1R_2$—O—$SiR_1R_2$—O—$SiR_1R_2$—).

The siloxane compound may be represented by the following formula: the value of x is an integer from 2 to 4 representing the number of Si atoms of the siloxane core group (x=2, 3, or 4). For example, in one embodiment $(A)(B)_3$, B is a bivalent moiety —$(CH_3)_2Si$—O—$Si(CH_3)_2$—O—$Si(CH_3)_2$—, such that when substituted with the PEG, the $(A)(B)_3(A)$ formula may represent A-$(CH_3)_2Si$—O—$Si(CH_3)_2$—O—$Si(CH_3)_2$-A, wherein the terminal Si atoms are covalently linked to the A groups which are the PEG groups. Herein, x is 3. In another embodiment wherein x is 4, A is a tetra-valent moiety, —$(CH_3)_2Si$—O—$Si(CH_3)_2$—O—$Si(CH_3)_2$—O—$Si(CH_3)_2$—, wherein each Si atom is covalently linked to A groups which are PEG groups such that the $(A)(B)_4(A)$ represents A-$(CH_3)_2Si$—O—$Si(CH_3)_2$—O—$Si(CH_3)_2$—O—$Si(CH_3)_2$—O—$Si(CH_3)_2$-A.

Within the present disclosure, the solvents have a molecular weight of at least 454 g/mol, and may have a molecular weight of up to 1000 g/mol. One can adapt the molecular weight to provide the best combination of properties including vapor pressure and viscosity.

As noted, the siloxane compound is modified with multiple addition of PEG. PEG are polyether olefins, alternatively known as poly(ethelyeneoxy), generally having a formula —[O—$CH_2CH_2$]$_n$— or

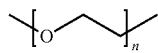

where within this disclosure, n is an integer 3 to 5, or a triox-ene (-3PEG) to pentaox-ene (-4PEG). In one embodiment, the two PEG groups covalently linked to the siloxy compound is a triox-ene (-3PEG). In another embodiment, the two PEG groups covalently linked to the siloxy compound is a tetraox-ene (-4PEG). In another embodiment, the two PEG groups covalently linked to the siloxy compound is a pentaox-ene (-5PEG). For preparation of the substituted siloxanes, representative PEG starting groups include those depicted in FIG. 1. The PEG groups are linked to the siloxyl core group via a propylene bridging or linking group, —$CH_2CH_2CH_2$— as shown in the general synthetic scheme of FIG. 2.

Within the disclosure, it is contemplated only a single PEG may be covalently linked to each Si atom and that both PEG groups will be the same. Thus, in a trisiloxane where each Si atom is covalently linked, two of the siloxane silicon atoms will be linked to a PEG, for two PEG groups on the solvent Molecule, while one Si is not substituted with PEG.

Figure 3:
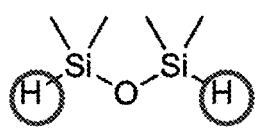
FIG. 3 illustrates the absorption isotherms for $CO_2$ 25° C. in Selexol, T-4PEG, and disub-4PEG.
Figure 3:
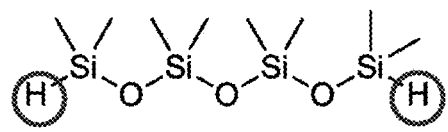
Figure 3:
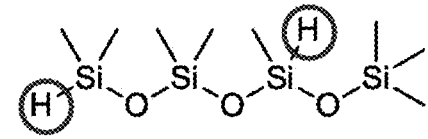
Figure 3:
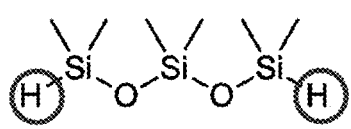
Figure 3:
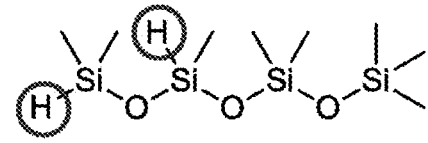
Figure 3:
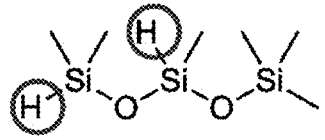
Figure 4:
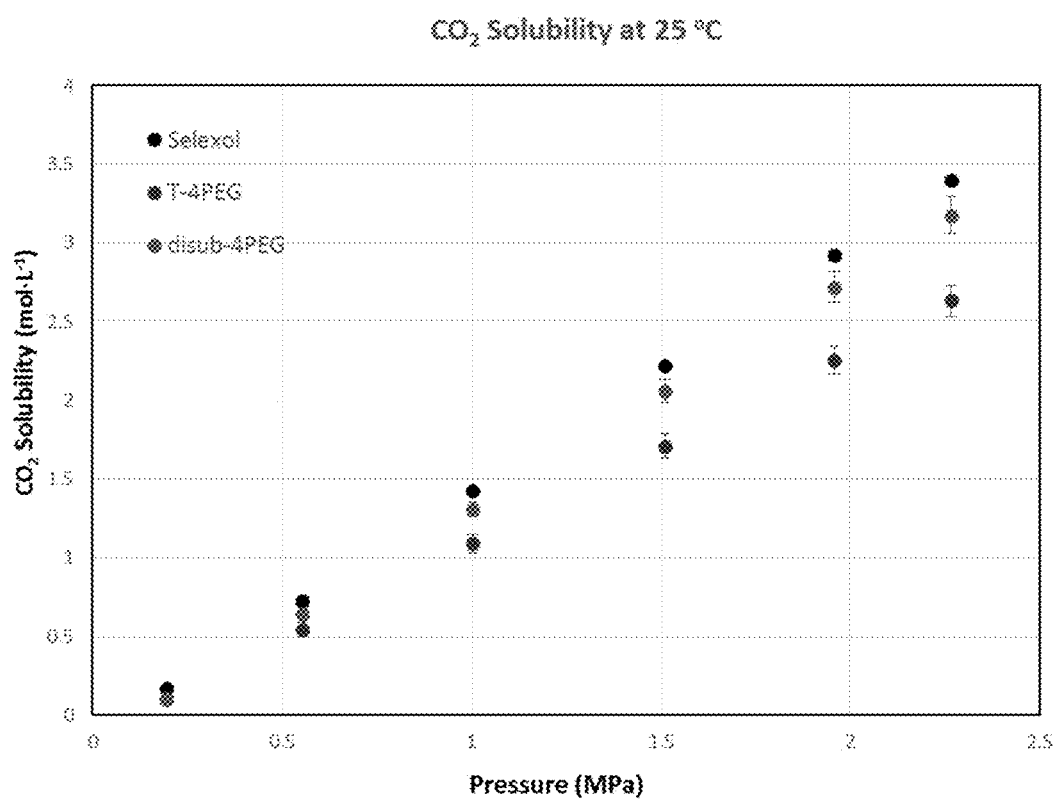
FIG. 4 illustrates siloxane reaction sites for synthesis of a solvent where the PEG groups are inserted for disiloxane, trisiloxane, and tetrasiloxane core units.
Figure 5:
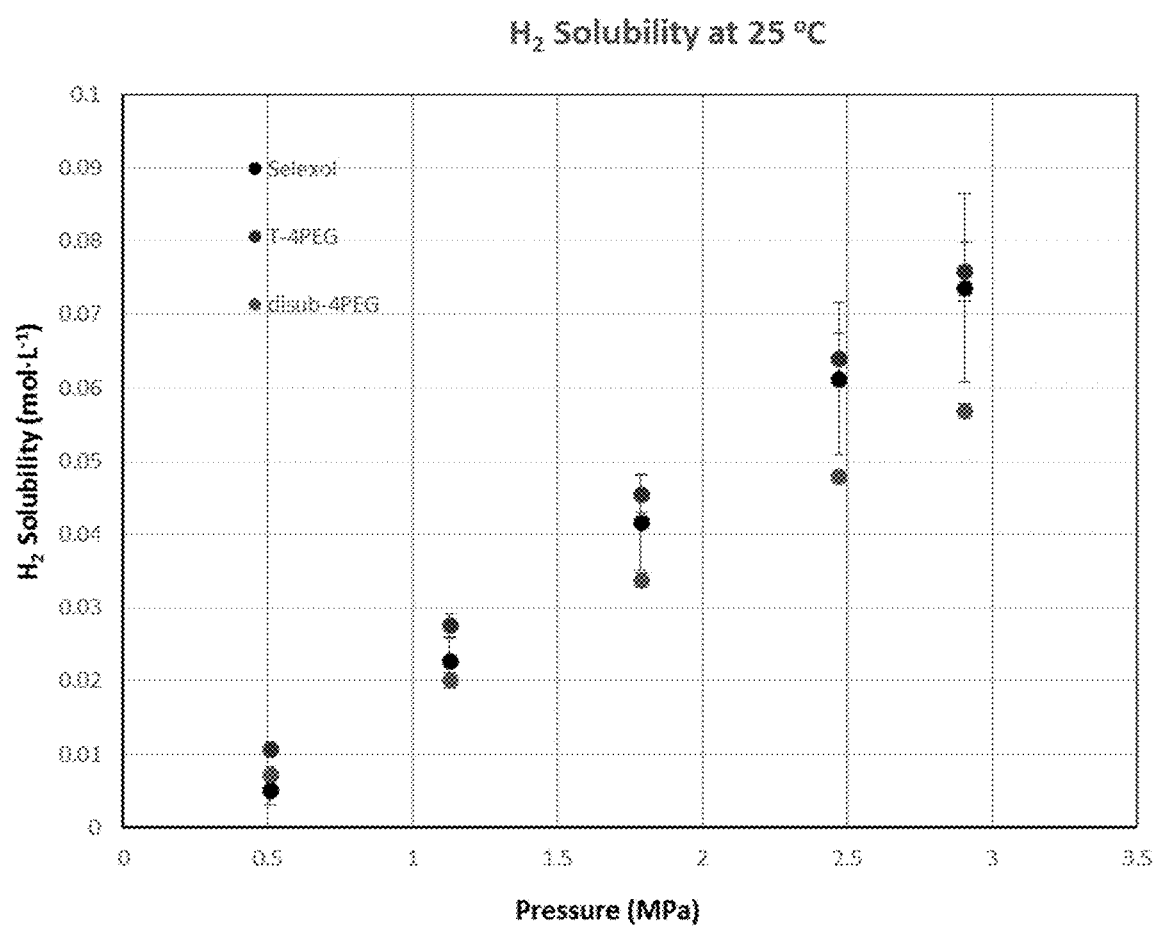
FIG. 5 illustrates the absorption isotherms for $H_2$ at 25° C. in Selexol, T-4PEG, and disub-4PEG.
Figure 6:
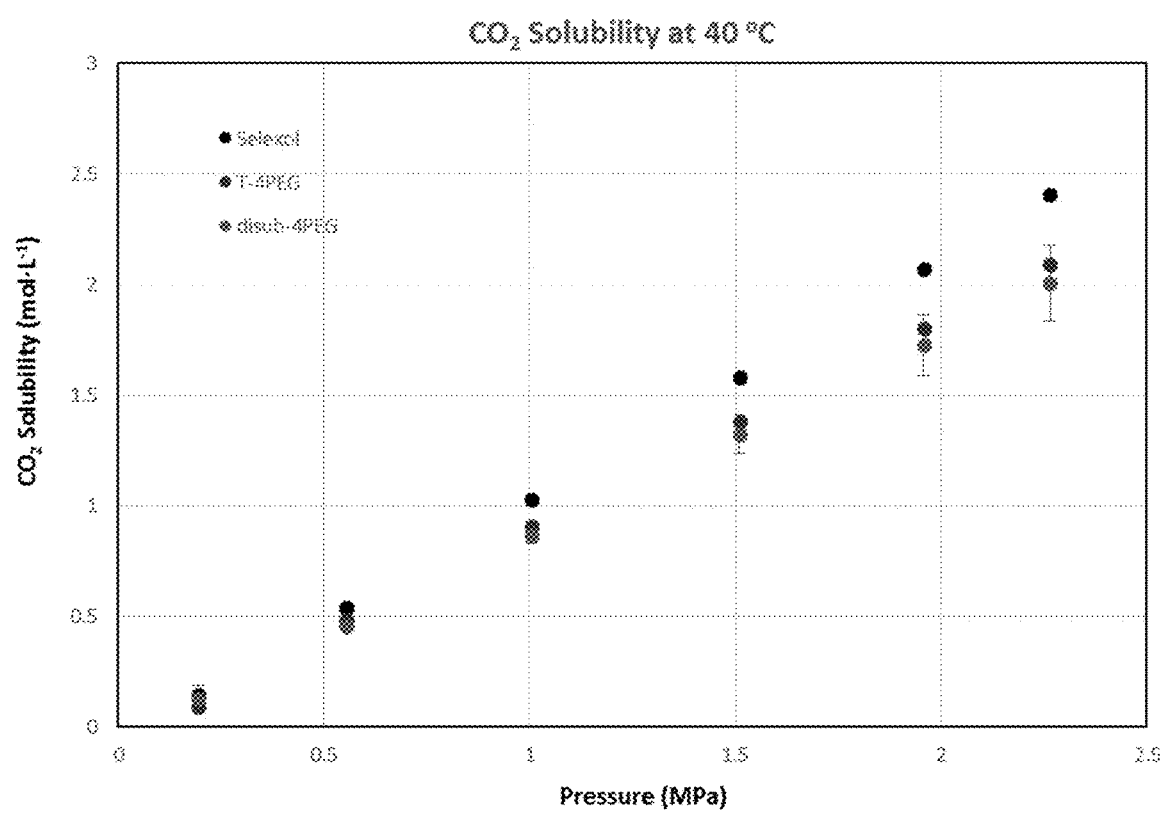
FIG. 6 illustrates the absorption isotherms for $CO_2$ at 40° C. in Selexol, T-4PEG, and disub-4PEG
Figure 7:
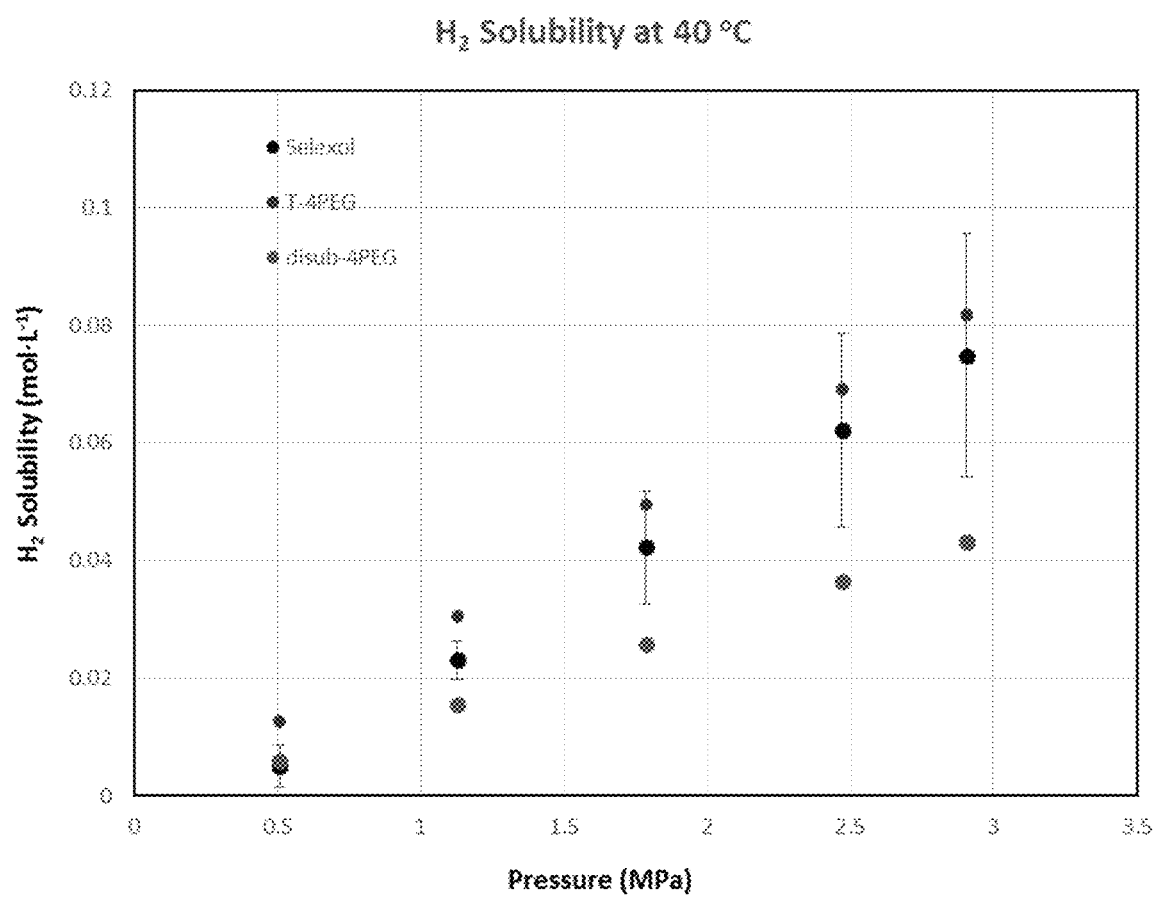
FIG. 7 illustrates the absorption isotherms for $H_2$ at 40° C. in Selexol, T-4PEG, and disub-4PEG FIG. 8 compares the $CO_2/H_2$ selectivities for hydrophilic Selexol and hydrophobic poly(dimethylsiloxane), T-4PEG, and disub-4PEG.

Within this disclosure, the PEG substitution may be distributed, where distributed is defined as where both PEG are covalently linked to their respective base Si atom and further where the respective base Si atoms are not adjacent to one another. FIG. 3 illustrates siloxane reaction sites for synthesis of a solvent where the PEG groups would insert into Si—H bonds in disiloxane, trisiloxane, and tetrasiloxane core groups. An exemplary distributed solvent is the 4PEG disubstituted trisiloxane depicted:

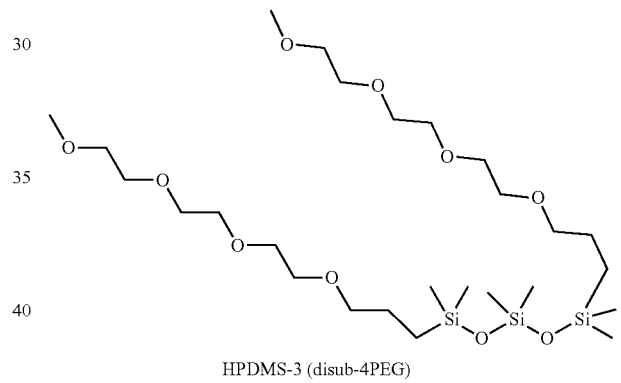

HPDMS-3 (disub-4PEG)

The solvent can be described by its physical properties. For example, one important property of the solvent is viscosity. Suitable viscosity provides for good mass transfer and quick uptake of gas in the solvent. Viscosity can vary with the temperature, but at or near 25° C., for example, viscosity was measured at 7.2-16.0 mPa·s.

Table 1 provides viscosity data at 25° C., including densities, surface tensions, and water content. Experimental error can be, for example, ±0.02 mPa·s.

TABLE 1

Physical properties of disubstituted-nPEG solvents

| Product | FW, g/mol | density, g/mL | $V_{molar}$, mol/mL | viscosity, mPa·s | $H_2O$ content, ppm[a] | surface tension, mN/m | foam |
|---|---|---|---|---|---|---|---|
| disub-3PEG (7) | 528.9 | 1.02 | 518.5 | 7.2 | 908 | 22.9 | no |
| disub-4PEG (8) | 617.0 | 0.987 | 625.1 | 12.2 | 853 | 22.5 | no |
| disub-5PEG (9) | 705.1 | 1.11 | 635.2 | 16.0 | 775 | 22.8 | no |

The viscosity of disubstituted solvents as used in the present disclosure are greater than previously described mono-substituted solvents (U.S. Pat. No. 9,643,123). For example, the viscosities for all disubstituted solvent molecules at 25° C. were below 20 mPa·s. The viscosities would be even lower within the expected working temperature range of 40° C. to 80° C.

Figure 8:
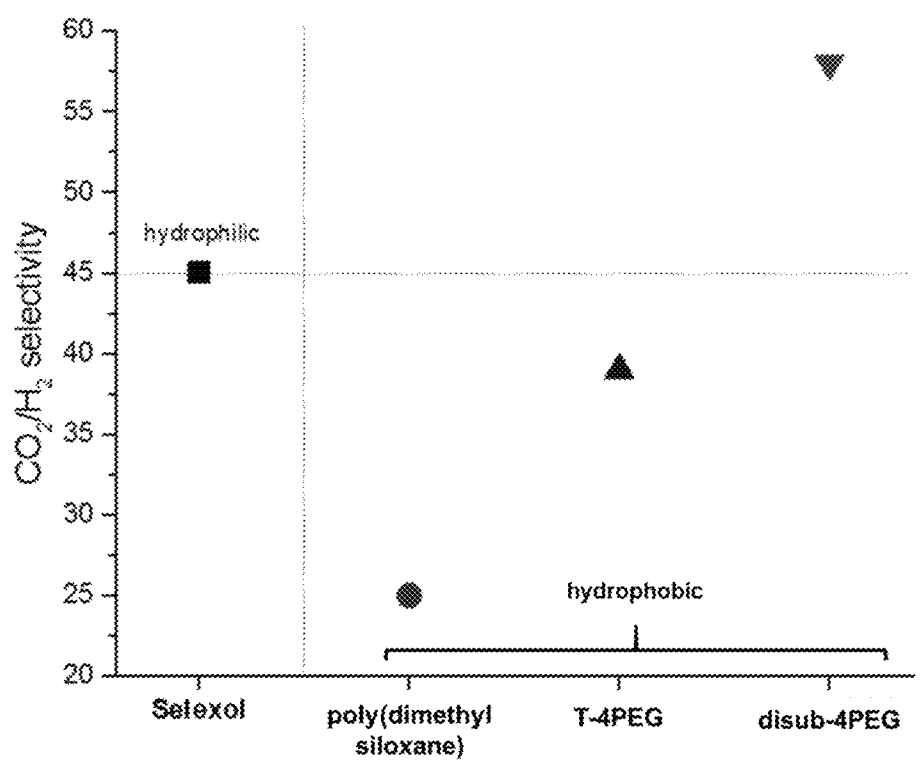

Another important property of the solvent is the preferential uptake of the desired gas constituent. In IGCC operations, preferential absorption of $CO_2$, into the solvent over the undesired gas constituent $H_2$. Gas absorption experiments conducted in a continuously-stirred tank reactor using these gases showed that at both 25° C. and 40° C., disub-4PEG trisiloxane had higher selectivity for $CO_2$ over $H_2$ than Selexol. These results are shown in FIGS. 4-7. FIG. 8, illustrates experimental results for the $CO_2/H_2$ selectivity where the $CO_2/H_2$ selectivity of the mono-substituted solvents (U.S. Pat. No. 9,643,123) is intermediate to that of Selexol (poly(dimethylsiloxane) and disub-4PEG trisiloxane.

TABLE 2

$CO_2/H_2$ selectivities for Selexol, T-4PEG, and disub-4PEG at 25° C. and 40° C.

| solvent | $CO_2/H_2$ selectivity at 25° C. | $CO_2/H_2$ selectivity at 40° C. |
|---|---|---|
| Selexol | 45.0 | 30.7 |
| T-4PEG | 38.5 | 27.4 |
| disub-4PEG | 57.7 | 48.3 |

Figure 9:
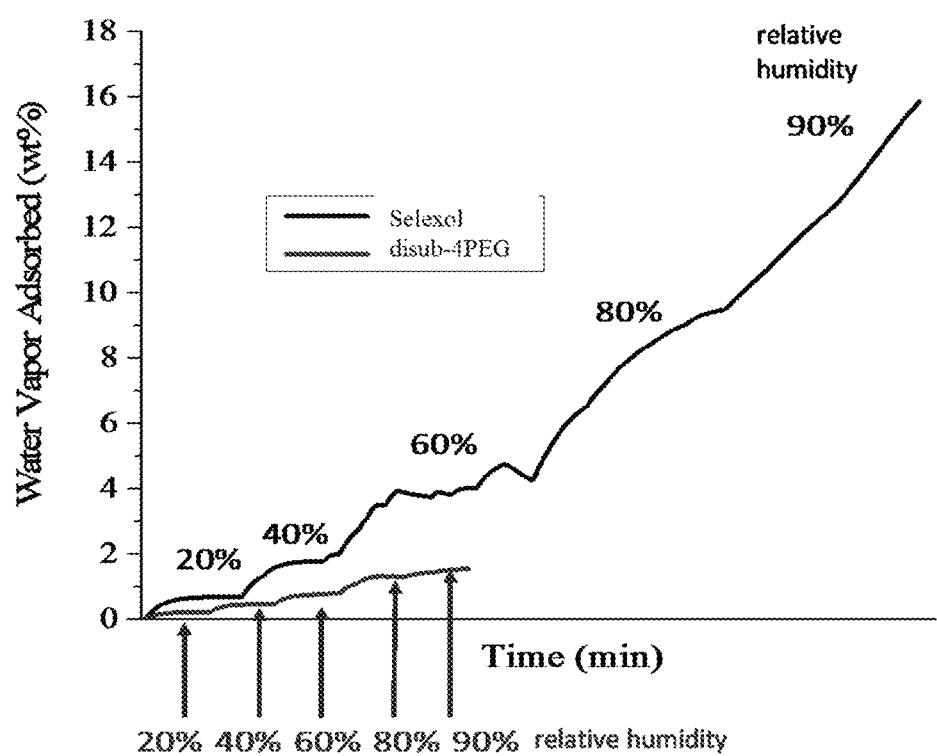
FIG. 9 illustrates a comparison of the weight changes experienced in moist $CO_2$ for a Selexol surrogate and disub-4PEG.

Yet another important property of the solvent is the reduced amounts of water absorption. The compound should be hydrophobic. The absorbed water content should be, for example, about 1 wt. % or less, or preferably 0.1 wt. % or less. The disub-4PEG trisiloxane quickly reaches saturation at low levels of absorbed water (<2 wt. %), even at 90% relative humidity. FIG. 9 illustrates a comparison of water vapor absorption for disub-4PEG and a Selexol surrogate. Sample temperature at 25° C.; feed gas is a blend of wet and dry $N_2$. The percent of wet $N_2$ in the feed stream at different points in the curves is indicated by the numbers on the plot. It is important to note that the Selexol surrogate does not approach saturation under high humidity conditions, suggesting that the amount of water absorbed can continue indefinitely.

In many situations, advantages can be obtained when water is allowed to be present, or steps are not taken to remove water. The gaseous mixture can be saturated with water, including water vapor. The amount of water is not particularly limited, but in many cases will be saturated at the particular temperature of the gaseous constituents. The saturation amount, as known in the art, can be adapted for the particular temperature and pressure of the process.

Figure 10:
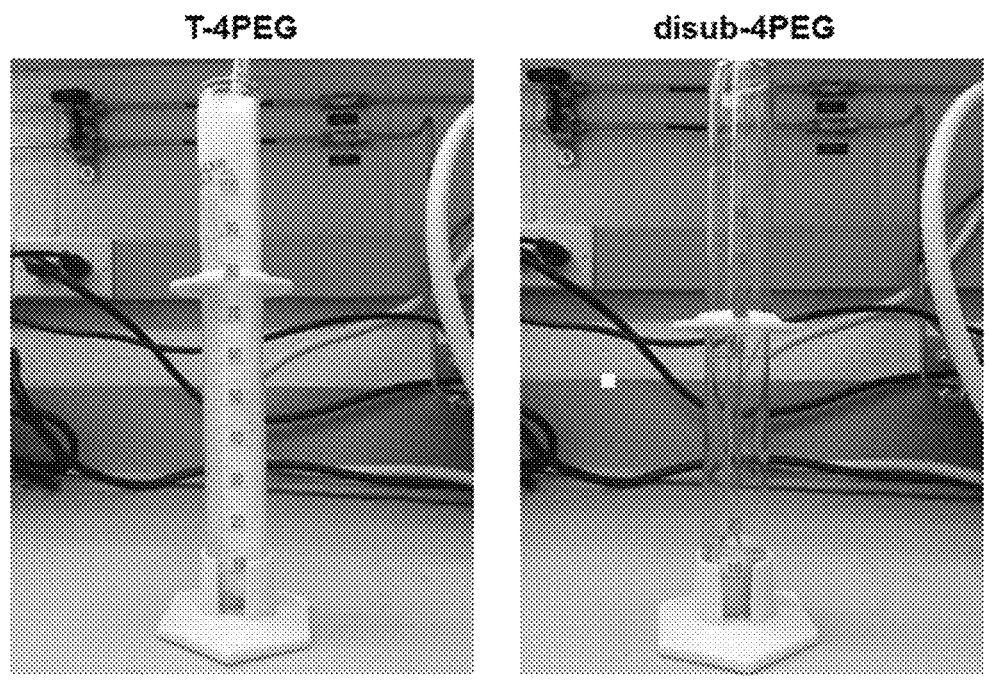
FIG. 10 illustrates by photograph a comparison of foaming behavior exhibited by a T-4PEG and disub-4PEG under identical gas stream conditions.

One characteristic of the physical properties of solvents as in the present disclosure is the lack of foaming when exposed to a stream of gas. In the absence of a standard ASTM test for foaming, a foaming test was devised in which a 100 mL graduated cylinder was filled with 10 mL of solvent and $N_2$ was delivered through a fritted gas diffusion tube at 1 L/min into samples of T-4PEG and the disub-4PEG trisiloxane solvent as in the present disclosure. The foam, if formed, was allowed to reach steady state before recording a foam volume. There was essentially no foam for disub-4PEG trisiloxane with flowing gas. However, in the case of the monosubstituted T-4PEG, the volume of foam would have overflowed the 100 mL graduated cylinder during the test, so gas flow was ceased. After shutting off the gas flow, the foam remained stable in T-4PEG, but for disub-4PEG trisiloxane the foam dissipated immediately. Images of this testing can be seen in FIG. 10, in which the height of observed foam level during gas delivery was found to overflow the cylinder for the monosubstituted siloxane solvent. Solvents in which foam persisted after 1 minute under such testing were considered to be foaming.

Figure 11:
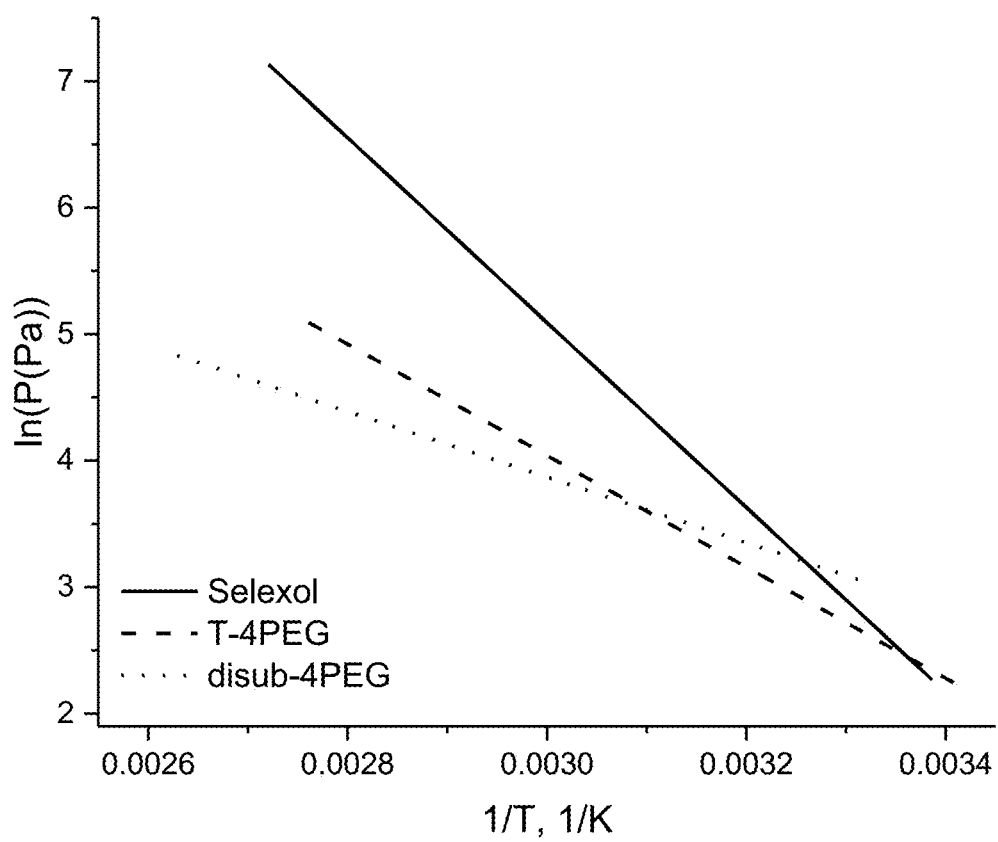
FIG. 11 plots experimental data of the natural logarithm of vapor pressures (in Pascal) for Selexol, T-4PEG, and disub-4PEG from 15° C. to 125° C., showing how disub-4PEG exhibits lower vapor pressure throughout the anticipated useful temperature range of 40° C. to 80° C.

Another important characteristic of the physical properties of solvents as in the present disclosure is the low vapor pressure of the solvent under the elevated temperatures (40° C. to 80° C.) experienced during gas absorption. Current carbon capture solvents require operating temperatures at or below room temperature, which requires expensive cooling systems to avoid evaporation of solvent due to their high volatility. A benefit of the solvents in the present disclosure is their reduced volatility. This can be seen in FIG. 11 in which the measured vapor pressures of disub-4PEG trisiloxane, T-4PEG, and Selexol surrogate are shown. The vapor pressure of disub-4PEG is lower than the other two solvents throughout most of the 40° C. to 80° C. temperature operating range. This is also shown in Table 3, which lists the vapor pressure at 80° C. and the daily weight loss for each of these solvents showing the superior performance disub-4PEG compared to Selexol and T-4PEG.

TABLE 3

Vapor pressure and weight loss per day of solvents tested at 80° C.

| Product | vapor pressure at 80° C., Pascal | weight loss per day, % |
|---|---|---|
| Selexol surrogate | 5120 | — |
| T-4PEG | 209 | 36% |
| disub-4PEG | 70.8 | 7% |

For the solvent as used in the present method, mixtures of two or more solvents may be used. The siloxane compound may be included in a composition comprising one or more components or additional solvents which are not according to the embodiments described herein including additives.

In regenerating, at least a portion of the absorbed constituent gas of the laden solvent is removed from the laden solvent, in effect reforming the solvent to allow cycling operations of the method. Regenerating may be performed by one or more removal steps. As known in the art, regenerating may be carried out using either temperature or pressure swing approaches, or a combination of temperature and pressure swing. As a salient aspect of the presently disclosed solvents is that they can operate above room temperature, which means that waste/low grade heat (50° C.-180° C.) can be used to provide the thermal energy needed to separate the dissolved constituent from the solvent, thereby regenerating the solvent required for the contacting step. The ability to use waste/low-grade heat leads to savings in electrical energy, which would be required for solvents operate at below room temperature. Regenerating may be performed at a temperature from about 10° C. to about 150° C. Preferentially, regenerating may be performed at a temperature from about 40° C. to about 120° C. In one realization, gas contacting would occur at 40° C. and the solvent would be regenerated stepwise in multiple flash tanks at temperatures of 40° C., 60° C., 80° C., and 100° C.

Other known processing steps can be carried out. For example, filtering can be carried out. As known in the art, pumps, coolers, and heaters can be used. After at least partial dissolution of an acid gas such as $CO_2$ in the solvent the solvent may be separated from the dissolved $CO_2$ and recycled.

Figure 2:
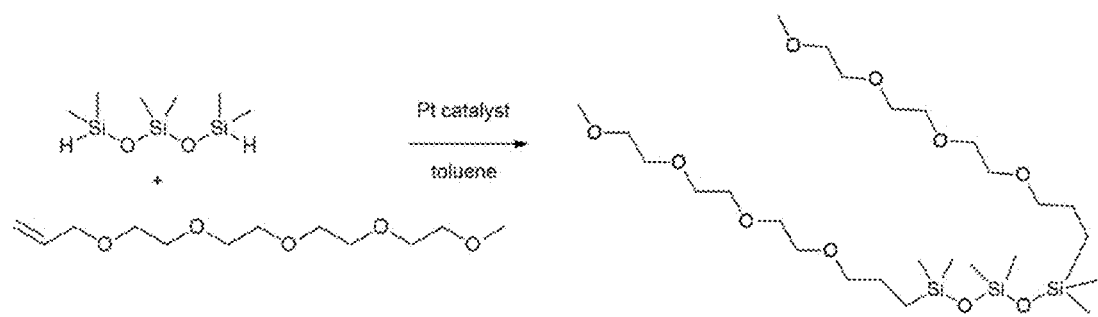
FIG. 2 illustrates the general synthesis of disubstituted siloxane based solvent disub-4PEG.

Examples:

The solvents were prepared by way of a hydrosilation reaction between commercially-available polyethylene glycol olefins and siloxysilanes, catalyzed by a Karstedt-type catalyst. This method of preparing these compounds was derived from reactions reported by Lewis, et al, and previously used at NETL. The different siloxane and poly(ethylene glycol)-olefin (PEG-olefin) reagents used to prepare the solvents are shown in FIG. 1; all reagents except 1,1,1,3,3,5,5-heptamethyltrisiloxane were used as received from Gelest; 1,1,1,3,3,5,5-heptamethyltrisiloxane was used as received from BOC Sciences.

The reagents were combined into three different products as illustrated in FIG. 3, which shows the preparation of disub-4PEG. Disubstituted products were prepared from the 2:1 mixtures of PEG-olefin and 1,3-disilane (disub-nPEG). Three different lengths of PEG-substituted product were prepared; all of the products prepared and studied in this work are listed in Table 1.

Synthesis of disub-3PEG: A 500 mL round bottomed flask was charged with 2 equivalents of 2,5,8-trioxaundec-11-ene, 0.3 mL platinum(0)-1,3-divinyl-1,1,3,3-tetramethyldisiloxane complex solution (2% Pt in xylene), and a stir bar. The resultant homogeneous solution was cooled to 20° C. in a water bath and slowly treated drop-wise with 1,1,3,3,5,5-heptamethyltrisiloxane. The rate of dropping was controlled to occur over 30 min. time. The temperature was maintained around 20° C. for 1 hour during which the clear reaction solution eventually became dark yellow. The resultant solution was left to stir at room temperature overnight. This solution was washed with 3×100 mL 2% aqueous NaCl to extract any unreacted olefin. The organic layer was filtered through Celite and evaporated to give a brown liquid, which was passed through a short column of silica gel for purification. The product was then dried on a Kugelrohr at 50° C. for 3 days. Upon drying, disub-3PEG was obtained as a pale-brownish liquid product.

Synthesis of disub-4PEG: A method similar to that described for (1) was employed using 2 equivalents of 2,5,8,11-tetraoxatetradec-13-ene, Karstedt catalyst, and 1,1,3,3,5,5-hexamethyltrisiloxane.

Synthesis of disub-5PEG: A method similar to that described for (1) was employed using 2 equivalents of 2,5,8,11,14-pentaoxaheptadec-16-ene, Karstedt catalyst, and 1,1,3,3,5,5-hexamethyltrisiloxane.

Physical properties for all solvents studied are listed in Table 1. The densities of all products were approximately 1 g/mL, with the densities increasing as the length of the PEG arm increases. The viscosities for all three products were all less than 20 mPa·s, with the viscosities increasing as the length of the PEG arm increases. The water content after drying for all molecules was consistently low, despite having been thoroughly water-washed; all moisture contents were measured below 0.1 wt. %.

Figure 12:
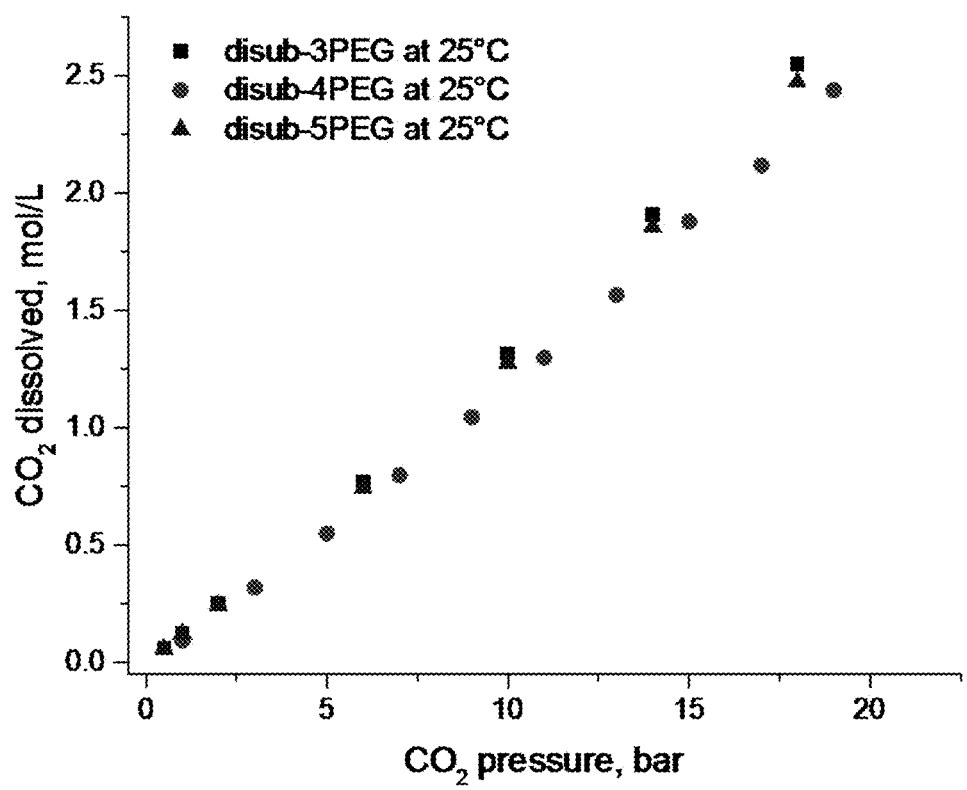
FIG. 12 shows the absorption of $CO_2$ at (a) 25° C. for three different versions of disubstituted disub-nPEG molecules as measured on a Hiden microbalance.
Figure 13:
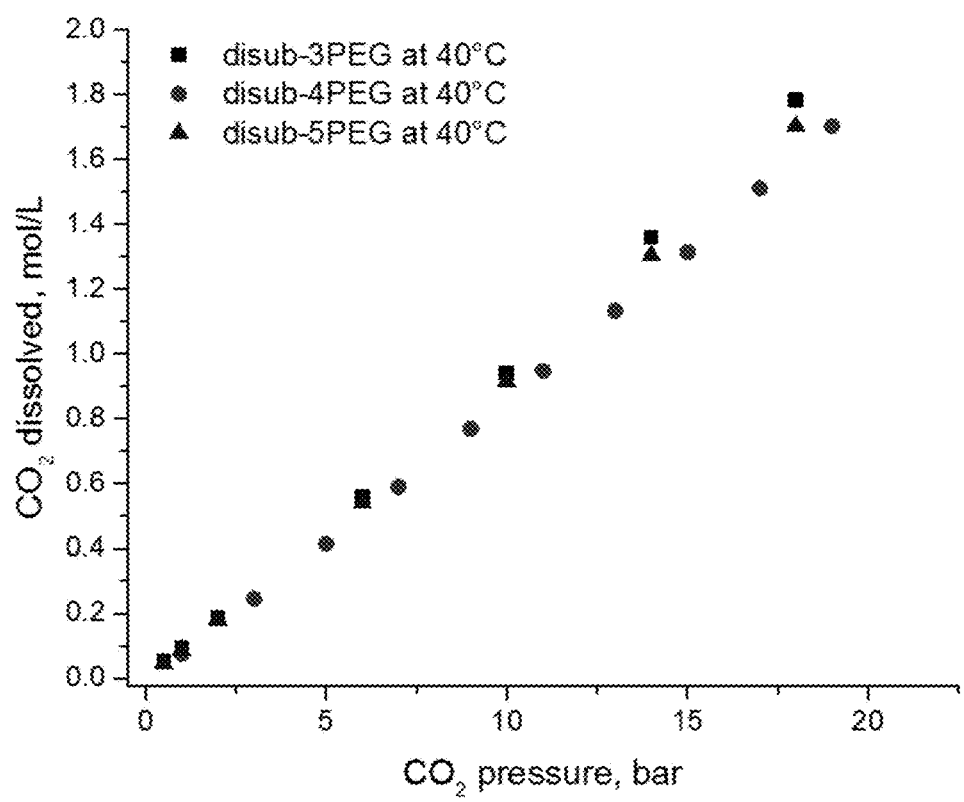
FIG. 13 shows the absorption of $CO_2$ at (b) 40° C. for three different versions of disubstituted disub-nPEG molecules as measured on a Hiden microbalance.

$CO_2$ Absorption:

All solvents prepared were tested for carbon dioxide ($CO_2$) absorption at 25 and 40° C., using $CO_2$ pressures from 0 to 20 bar of pressure on a Hiden microbalance. Plots of moles of $CO_2$ dissolved per liter versus $CO_2$ pressure are illustrated in FIGS. 12 and 13, with the data for both 25° C. and 40° C. shown. The data at 25° C. were corrected for $CO_2$ volume of expansion (FIG. 12), whereas the data at 40° C. were not (FIG. 13). Higher capacity for $CO_2$ absorption is reflected in larger slopes for the linear fit for these plots. The slope, slope standard error, and correlation coefficient for each solvent at both temperatures are listed in Table 4. These plots are linear ($r^2 \geq 0.997$) and the slope standard errors are all within 2% of the slope values. The linear fits for the 40° C. data tended to be more linear (avg. $r^2=0.999$) than at 25° C. (avg. $r^2=0.998$).

TABLE 4

$CO_2$ absorption data measured for disubstituted solvents at 25° C. and 40° C.

| T = 25° C. | slope | $r^2$ | disub-3PEG normalized | % disub-3PEG |
|---|---|---|---|---|
| disub-3PEG | 0.14047 | 0.9980 | 1.0000 | 100.00 |
| disub-4PEG | 0.12994 | 0.9977 | 0.9250 | 92.50 |
| disub-5PEG | 0.13645 | 0.9980 | 0.9714 | 97.14 |

| T = 40° C. | slope | $r^2$ | disub-3PEG normalized | % disub-3PEG |
|---|---|---|---|---|
| disub-3PEG | 0.09839 | 0.9991 | 1.0000 | 100.00 |
| disub-4PEG | 0.09030 | 0.9994 | 0.9178 | 91.78 |
| disub-5PEG | 0.09433 | 0.9996 | 0.9587 | 95.87 |

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

We claim:

1. A method for separating a gas from a gaseous mixture, the method comprising:
    supplying a gaseous mixture having at least two constituents;
    contacting the gaseous mixture with a solvent where the solvent comprises a PEG disubstituted siloxane having 2-4 Si atoms, such that at least one constituent of the gaseous mixture preferentially dissolves into the solvent to form a laden solvent; and,
    regenerating the laden solvent.

2. The method of claim 1, wherein the gaseous mixture comprises hydrogen and an acid gas.

3. The method of claim 2, wherein the acid gas is carbon dioxide or hydrogen sulfide.

4. The method of claim 3, wherein the acid gas is carbon dioxide.

5. The method of claim 4, where the gaseous mixture is at a carbon dioxide feed partial pressure from about 1 MPa to about 3 MPa.

6. The method of claim 1, wherein the solvent's molecular structure has 3 Si atoms.

7. The method of claim 1, wherein the PEG is a -3PEG to a -5PEG.

8. The method of claim 7, wherein the PEG is a -4PEG.

9. The method of claim 1, wherein the PEG is distributed.

10. The method of claim 1, wherein the solvent is non-foaming.

11. The method of claim 1, wherein the solvent has a $CO_2/H_2$ selectivity greater than 40 at 25° C. and greater than 30 at 40° C.

12. The method of claim 1, wherein the vapor pressure of the solvent is less than 200 Pascals at 80° C.

13. The method of claim 1, wherein contacting the gaseous mixture is carried out at a temperature of about 40° C. to about 80° C.

14. The method of claim 1, wherein regenerating the laden solvent is at a temperature from about 10° C. to about 150° C.

15. The method of claim 1, wherein the gaseous mixture comprises hydrogen and carbon dioxide, wherein the carbon dioxide is supplied at partial pressure ranging from about 1 MPa to about 3 MPa, where the solvent's molecular structure has 3 Si atoms, where the PEG is distributed 4PEG, wherein the $CO_2/H_2$ selectivity of the solvent is greater than 40 at 25° C. and greater than 30 at 40° C., wherein the vapor pressure of the solvent is less than 200Pascals at 80° C.; wherein contacting is carried out at a temperature of about 40° C. to about 80° C., and wherein regenerating is at a temperature from about 10° C. to about 150° C.

* * * * *